United States Patent [19]

Himmler

[11] Patent Number: 4,854,168
[45] Date of Patent: Aug. 8, 1989

[54] METHOD FOR BALANCING A ROTOR, IN PARTICULAR A MOTOR VEHICLE WHEEL, IN TWO PLANES

[75] Inventor: Gunther Himmler, Darmstadt, Fed. Rep. of Germany

[73] Assignee: Hofmann Werkstatt-Technik GmbH, Pfungstadt, Fed. Rep. of Germany

[21] Appl. No.: 228,705

[22] Filed: Aug. 5, 1988

[30] Foreign Application Priority Data

Aug. 5, 1987 [DE] Fed. Rep. of Germany ....... 3726024

[51] Int. Cl.$^4$ ............................................. G01M 1/14
[52] U.S. Cl. .................................................... 73/459
[58] Field of Search ................. 73/460, 468, 462, 459, 73/66; 364/576

[56] References Cited

U.S. PATENT DOCUMENTS 4,302,966 12/1981 Ohnishi et al. .................... 73/459 X

FOREIGN PATENT DOCUMENTS 571723 9/1977 U.S.S.R. ................................ 73/468

Primary Examiner—Jerry W. Myracle
Attorney, Agent, or Firm—Cushman, Darby & Cushman

[57] ABSTRACT

A method and device for the balancing of a rotor in two planes. A static imbalance is formed from the result of imbalance vectors measured in the planes. Balance weights are fixed on the rotor in those angle positions so that a minimized static imbalance is provided.

7 Claims, 3 Drawing Sheets

METHOD FOR BALANCING A ROTOR, IN PARTICULAR A MOTOR VEHICLE WHEEL, IN TWO PLANES

FIELD OF THE INVENTION

This invention relates to a method for balancing a rotor, in particular a motor vehicle wheel, in two planes, in which balance weights provided in stepped weight sizes and depending on the imbalance values measured are fixed in the compensating angle positions opposite the imbalance angle positions which are determined. The present invention further relates to a device for balancing a rotor as stated, and to a measuring device for the determination of imbalance vectors in the two planes and providing signal outputs for the value and angle position of the two measured imbalance vectors associated therewith.

BACKGROUND OF THE INVENTION

Imbalances on balanced rotors such as, for example, wheels of motor vehicles, may be the result of machine errors, defects of the rotor or defects of the fastening device for the rotor. Further, imbalance in the measured planes may be caused by errors in balancing the mass which are the result of the weight tolerance of the balance weights (difference between the actual and set values of the balance weight) and of the weight sizes (size differences 5 g or 10 g) into which the available weights are divided.

In the known balance methods and devices, corresponding balance weights are installed in the angle positions opposite to the measured imbalance positions in order to remove the imbalance vectors determined in the two balancing planes. Because the balance weights are provided, as previously mentioned, in sizes of, for example, 5 or 10 g, there is normally a remaining imbalance in the corresponding balance plane since the size of the imbalance vector determined equals an available weight size only in a very few cases. A general dynamic imbalance consisting of the remaining balance pair and of a static imbalance results from the remaining imbalances in the balance planes.

The remaining static balance is the dominant cause of vibrations which are felt as steering disturbances and depends on the rotor and its placement, in particular in axle systems of motor vehicles.

SUMMARY OF THE INVENTION

Thus it is an object of the invention to provide a method and a device in which the static imbalance is reduced to a minimum.

These and other objects of the present invention are achieved by a method and device for balancing a rotor, in particular a motor vehicle wheel, in several planes. Balance weights available in stepped weight sizes are provided in which a static imbalance is formed from imbalance vectors measured in the two planes, and in which the balance weights are fixed in angle positions on the rotor, so that the resultant static imbalance is neutralized by the balance weights, and a minimized remaining static balance is attained.

Even though balance weights in stepped sizes are used, a decrease of the remaining static imbalance is attained at the rotor by means of the invention after balancing in the two balancing planes. The static imbalance resulting in the planes from the several, in particular two measured imbalance vectors is determined. This static imbalance is distributed on the planes according to the balance weights divided into weight sizes, which may result in an angular shifting in respect to the 180° angle positions of the measured imbalance angle positions in the planes. The respective balance weights are fixed on the rotor in the balance angle positions obtained by means of the optimization described. This results in a stepless compensation of the remaining static imbalance.

It is possible to preset limiting values for the remaining imbalances n the planes obtained from the values derived by means of prior measuring operations. Before or as soon as these values have been reached, the minimizing process is stopped.

However, in general the amount of the remaining static imbalances in the balance planes increases if the balance angle of 180° compared with the measured imbalance angle positions is abandoned. It has been shown that in the axle systems of motor vehicles the imbalance pairs in the balance planes may attain higher values than is the case in the conventional balance method in favor of minimal static imbalances.

It is, however, recommended to stay within limiting values here, too, the sum of which depends on the respective rotor and rotor disposition. Such limiting values for allowable remaining imbalances in the balance planes may have the result that in some cases the remaining static imbalance can only be minimized, but cannot be totally compensated for. This means that in respective angle positions compensation is attained when the remaining imbalance has reached a minimized size when, with an interruption of the minimizing process, the remaining imbalances in the balancing plane attain the set limiting values.

The invention will be described in detail by means of the attached drawings.

DETAILED DESCRIPTION OF A PREFERRED EMBODIMENT

Figure 1:
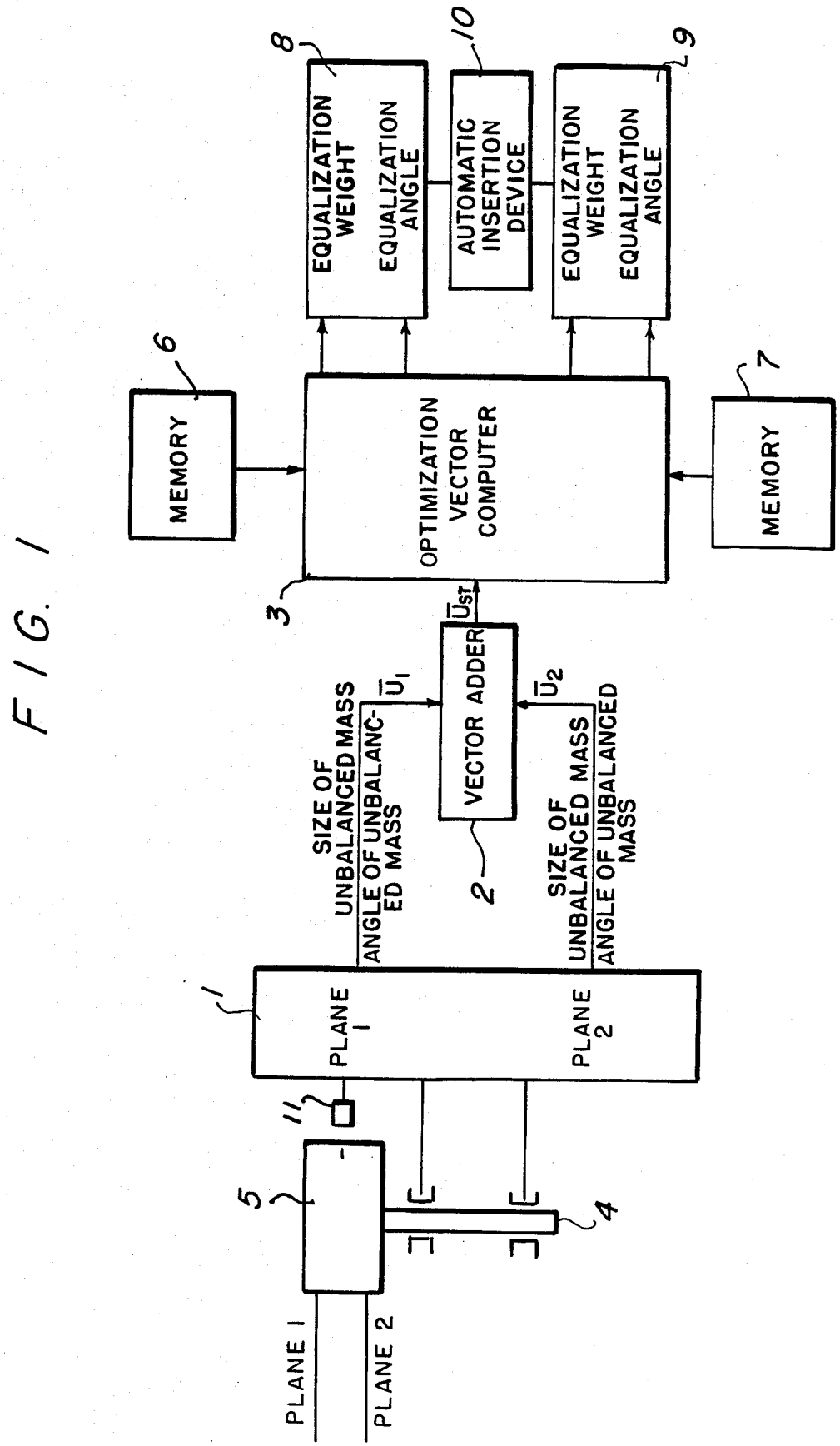
FIG. 1 is a schematic view of a preferred embodiment of the device in the form of a block diagram.

In FIG. 1 a rotor 5 to be balanced is shown on a balancing spindle 4 of a balancer of an imbalance measuring device. The rotor 5 is to be balanced in two planes, namely a first plane and a second plane. The rotor 5 may be a motor vehicle wheel. An angle reference signal can be obtained by means of a scanning device 11.

During the measuring, operation signals are emitted by the measuring device 1 in a known manner for the first as well as the second plane which correspond to the measured imbalance size and the measured imbalance angle in each plane. The measured imbalance size and the measured imbalance angle represent respectively one imbalance vector.

Figure 2:
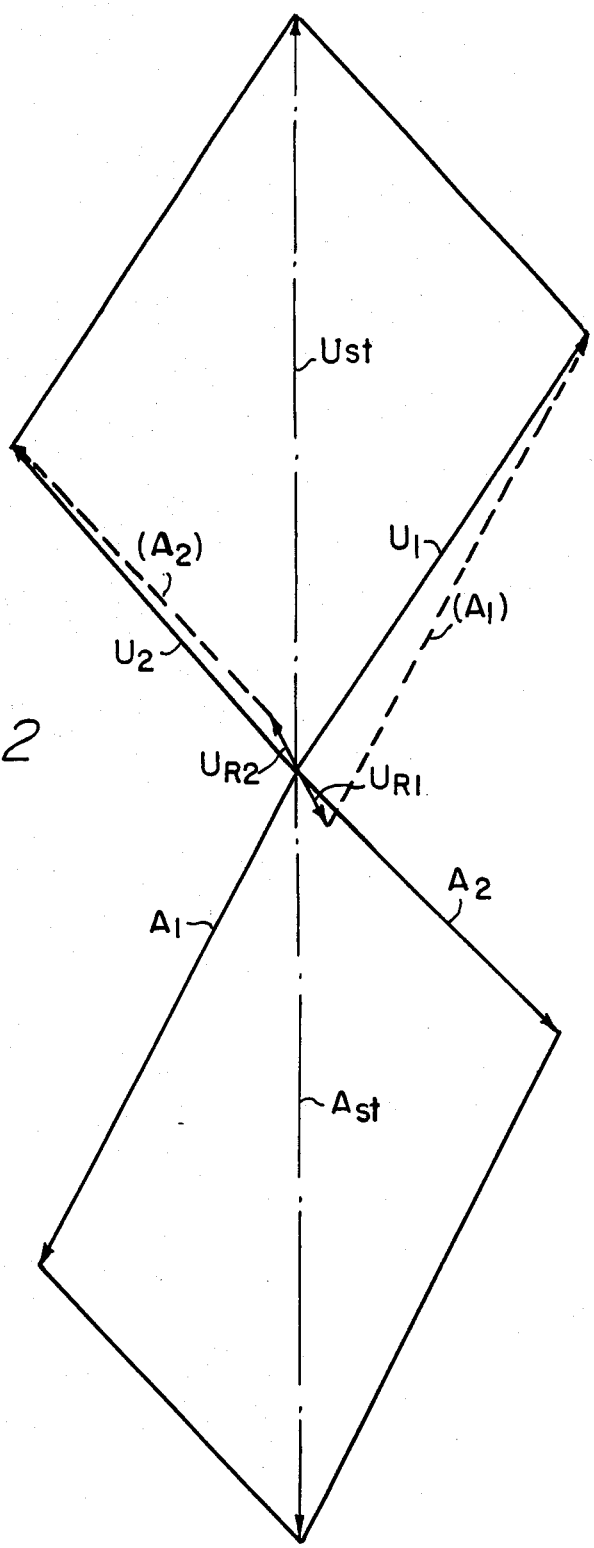
FIG. 2 is a vector diagram to explain the optimization process in accordance with a first preferred embodiment.

In FIG. 2 the measured imbalance vector for the first plane is designated by U1 and the measured imbalance vector for the second plane by U2. The two imbalance vectors U1 and U2 are vectorially added in a vector adder 2. This results in a static imbalance vector Ust, also shown in FIG. 2. The static imbalance vector Ust is supplied to an optimization vector computer 3. The corresponding mass information for the balance weights contained in the weight sizes is entered into the optimizing vector computer 3 from a memory 6 in which the weight sizes of the balance weights are stored. However, it is also possible to input these weight sizes into the optimizing vector computer 3 by means of an entry device which may have, for example, a keyboard. Furthermore, a memory 7 is connected to the optimizing vector computer 3 in which an upper limiting value for a permissible remaining imbalance in the balance planes is stored. In place of the memory 7 it is also possible to provide an input device for the highest permissible remaining imbalance value in the balance planes.

The optimizing vector computer 3 has a signal output for the balance weight and the balance angle for the first as well as for the second plane, which are determined in the course of the optimizing process which will be explained by means of FIG. 2. In the preferred embodiment shown, the two signal outputs are routed to respective control devices 8 and 9. In place of the control devices 8 and 9 it is also possible to provide corresponding display devices, so that rotation and setting of the balance weights can take place by hand. In the preferred embodiment shown the two control devices 8 and 9 are connected to a rotation device, present in the balancing device and connected with the balance spindle 4, so that the balance spindle can be rotated into the two balance angles determined for the first plane as well as for the second. Simultaneously, the two control devices 8 and 9 control in the preferred embodiment shown an automatic insertion device 10 for the balance weights selected for the respective two planes. This automatic insertion device may have a corresponding transfer device, by means of which the selected balance weights can be taken out of a magazine containing balance weights stored by weight size and set into the corresponding plane. Such a device is described, for example, in German Patent Application No. P 36 26 911.5.

As shown in FIG. 2, the two measured imbalance vectors U1 and U2 for the first and second plane are added in order to form the static imbalance vector Ust resulting therefrom. To compensate for this static imbalance vector Ust, it is necessary to form a compensating vector Ast directed 180° opposed. This takes place in the vector adder 2. This compensating vector Ast is split into two imbalance vectors A1 and A2 in the optimizing vector computer 3, the sums or sizes of which respectively corresponds to one of a preset weight sizes for the balancing weights. These compensating vectors A1 and A2 have certain angle positions which may differ from the 180° angle positions of the measured imbalance vectors U1 and U2.

Remaining imbalances UR1 and UR2 result for the two planes from these differences, which are added to form a remaining static imbalance URst. If these remaining imbalances UR1 and UR2 are equal and opposite in their sum or their size (FIG. 2), no remaining static imbalance remains.

Figure 3:
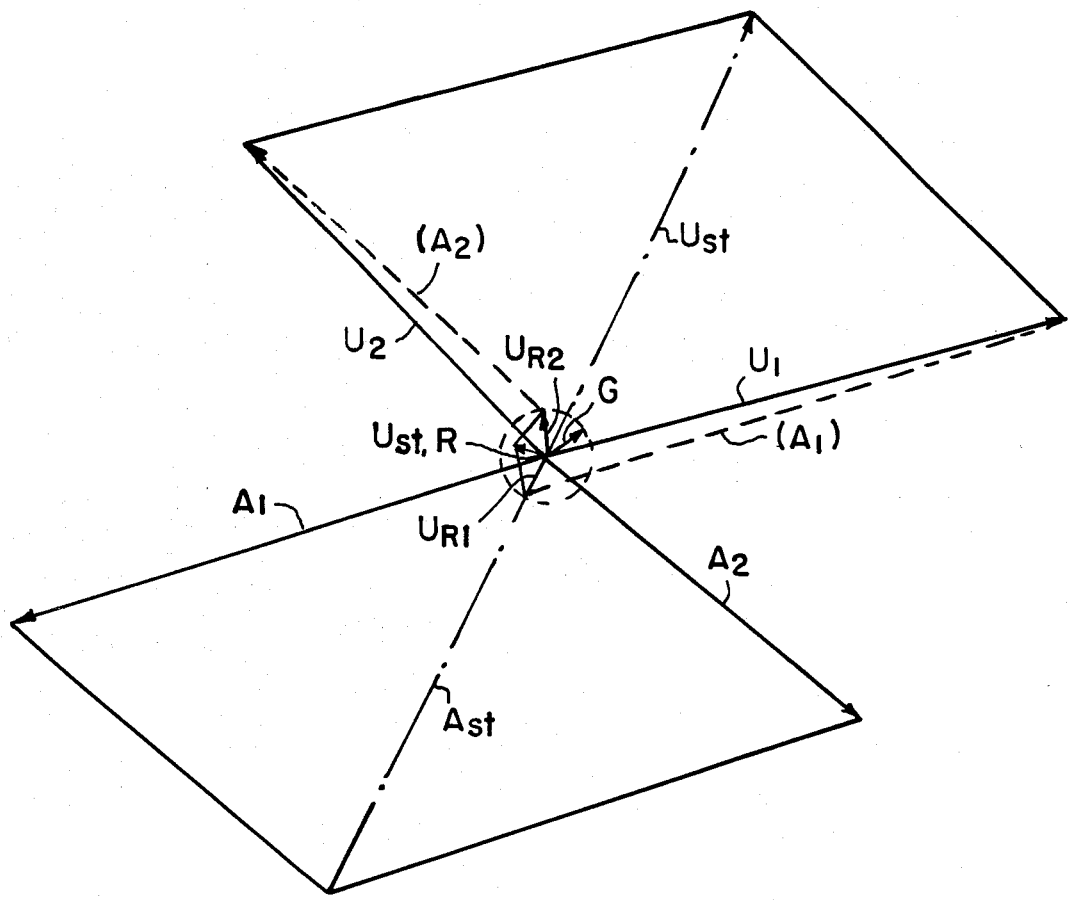
FIG. 3 is a further vector diagram to explain the optimization process in accordance with a second preferred embodiment.

An example is shown in FIG. 3 in which the optimization process was stopped when UR1 and UR2 had attained a limit value G shown by a circle. The addition of the vectors UR1 and UR2 then results in a remaining imbalance UStR which, however, is smaller than the one which would have occurred without use of the invention.

The balance weights and balance angles determined for the two planes are emitted at the outputs of the optimizing vector computer 3 in the form of corresponding signals and are further processed for balancing as explained above.

Measurement and balancing can also take place in more than two planes if required by operational requirements of the rotor and the rotor disposition. This may be the case in certain uses in connection with universal shafts, rotors of turbines and the like.

While the invention has been described in connection with what is presently considered to be the most practical and preferred embodiments, it is to be understood that the invention is not limited to the disclosed embodiments but, on the contrary is intended to cover various modifications and equivalent arrangements included within the spirit and scope of the appended claims.

What is claimed is:

1. A method of balancing a rotor in two planes comprising the steps of:
   measuring a first imbalance vector for said rotor in a first plane;
   measuring a second imbalance vector for said rotor in a second plane;
   forming a static imbalance vector from said first and second imbalance vectors;
   fixing balance weights on the rotor in said first and second plane so as to reduce the magnitude of said static imbalance vector.

2. A method in accordance with claim 1 wherein the balance fixing step is stopped as soon as the magnitude of the reduced static imbalance vector is reduced to a predetermined value.

3. A device for balancing a rotor in two planes comprising:
   means for measuring a first imbalance vector in a first plane for said rotor and generating a first vector signal therefrom;
   means for measuring a second imbalance vector in a second plane for said rotor and generating a second vector signal therefrom;
   means for forming a static imbalance vector from said first vector signal and said second vector signal;
   means for fixing weights to said rotor so as to reduce the magnitude of said static imbalance vector.

4. A device as in claim 3 wherein said means for forming a static imbalance vector is a vector adder which adds the first vector signal to the second vector signal.

5. A device as in claim 4 further comprising a data processor which computes an optimization vector which when added to said static imbalance vector reduces the magnitude thereof, said weights being fixed to said rotor in accordance with said optimization vector.

6. A device as in claim 5 wherein the data processor is in communication with a first memory which stores weight sizes of the weights to be fixed to the rotor.

7. A device as in claim 6 further comprising a second memory in communication with said data processor, said second memory stores an upper value for the magnitude of said static imbalance vector.

* * * * *